No. 747,590. PATENTED DEC. 22, 1903.
J. F. BUTZ.
FEEDING TROUGH.
APPLICATION FILED MAR. 18, 1902.
NO MODEL.
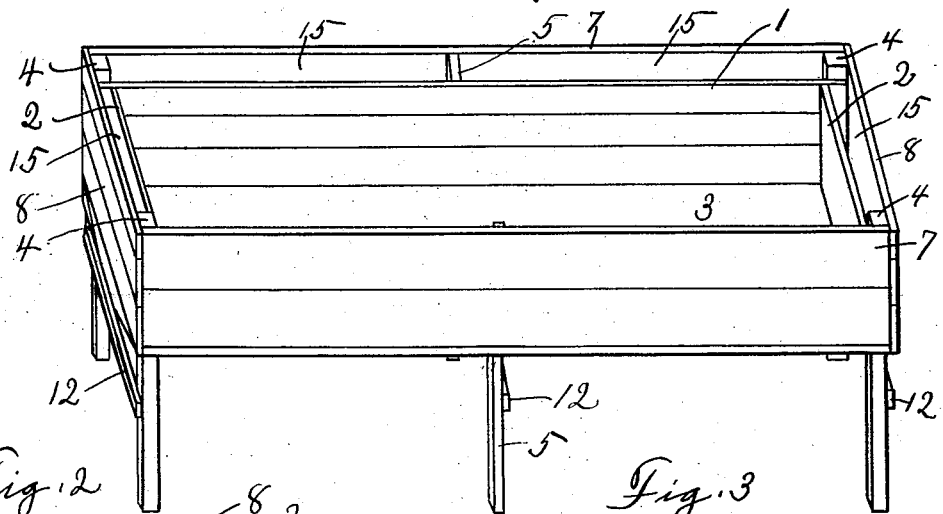
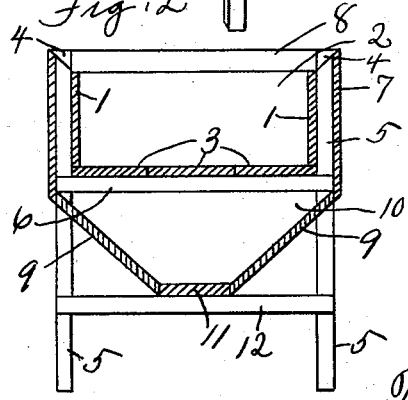 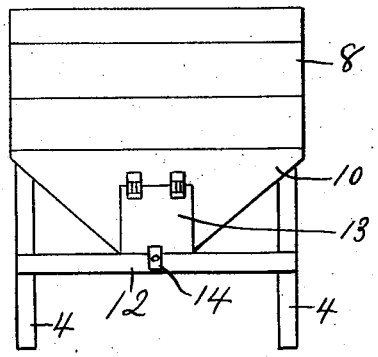
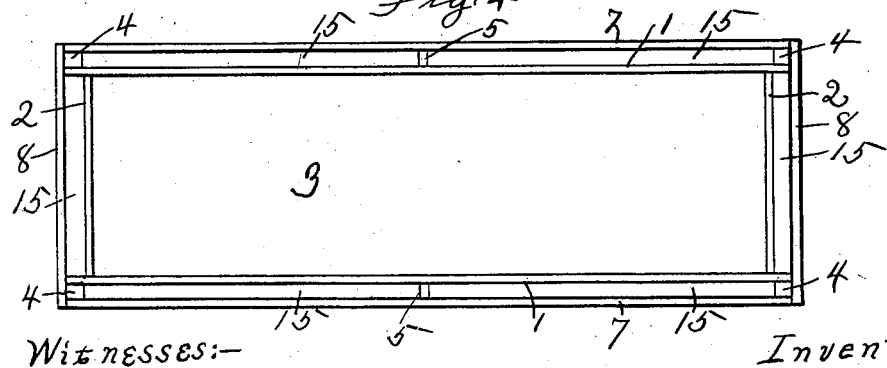
Witnesses:—
J. G. Beavers
J. W. Stitt.
Inventor,
J. F. Butz,
By A. L. Jackson,
Atty.

No. 747,590. Patented December 22, 1903.

UNITED STATES PATENT OFFICE.

JOHN F. BUTZ, OF FORT WORTH, TEXAS.

FEEDING-TROUGH.

SPECIFICATION forming part of Letters Patent No. 747,590, dated December 22, 1903.

Application filed March 18, 1902. Serial No. 98,749. (No model.)

*To all whom it may concern:*

Be it known that I, JOHN F. BUTZ, a citizen of the United States, residing at Fort Worth, Texas, have invented a new and Improved Feeding-Trough, of which the following is a specification.

This invention relates to troughs for feeding cattle or other animals; and the object is to construct a trough which will prevent the waste of food by collecting the food which drops from the main trough, so that it may be refed to the cattle and other animals. When cotton-seed meal or hulls are fed to cattle, much of the meal or hulls, as the case may be, is shoved out of the trough by the cattle and falls to the ground and becomes wasted. The loss of meal and hulls about such troughs is considerable every day. I have provided a subsidiary trough which will catch all of the food shoved out of the main trough, so that the food may be collected to be put back in the main trough.

Other objects and advantages will be fully explained in the following description, and the invention will be more particularly pointed out in the claims.

Reference is had to the accompanying drawings, which form a part of this application.

Figure 1 is a perspective view. Fig. 2 is a cross-section of the trough. Fig. 3 is an end view. Fig. 4 is a plan view.

Similar characters of reference are used to indicate the same parts throughout the several views.

The main trough consists of sides 1 and ends 2 and the bottom 3, supported by the corner frame-pieces 4, which may be made of timber four inches by four inches and of a suitable height. Frame-pieces 5 are also provided to support the trough intermediate the ends. These pieces may be two inches by four inches and of suitable height. The bottom is supported by suitable cross-pieces 6, which may be nailed or bolted to the upright pieces 4 and 5. The bottom 3 may consist of any suitable number of pieces bolted or nailed to the cross-pieces 6. The end piece 2 and side pieces 1 may be bolted or nailed to the upright pieces 4 and 5. The subsidiary troughs consist of the side pieces 7, which are nailed or bolted to the posts 4 and 5, end pieces 8, which are also bolted or nailed to the posts 4 and 5, the incline-pieces 9, end pieces 10, the inclines 9 and the end pieces 10 being nailed together and to the posts, and the bottom 11, which is supported on cross-pieces 12, which are bolted or nailed to posts 4 and 5. The subsidiary trough is provided with a door 13, which may be hinged to end piece 10 and held closed by suitable buttons 14. By this construction a subsidiary trough is provided for catching the food that may be shoved out of the main trough. The food drops through chutes 15, which are formed between the sides of the main trough and the subsidiary trough and between the ends of the main trough and the subsidiary trough. The food drops through chutes 15 and will fall on the inclines 9 and be gathered in the bottom of the subsidiary trough, whence it may be taken out through the door 13 and replaced in the main trough. Sides and ends of the subsidiary trough are higher than the sides and ends of the main trough, so that the food falling from the edges of the main trough will be caught by the sides and ends of the subsidiary trough.

Having fully described my invention, what I claim as new, and desire to secure by Letters Patent of the United States, is—

1. A trough consisting of sides and ends and a suitable bottom and provided with means for receiving the overflow or waste from said trough, said means consisting of a subsidiary trough having the sides and ends on the outside of said trough and projecting higher than the sides and ends of said trough and having the bottom beneath the bottom of said trough, chutes being formed between the sides of said trough and the sides of said subsidiary trough and between the ends of said trough and the ends of said subsidiary trough for directing the overflow or waste on the bottom of said subsidiary trough.

2. A trough constructed of suitable material and provided with a subsidiary trough underneath said trough, chutes on the sides and ends for catching and directing overflow or waste from said trough to said subsidiary trough, and a door to said subsidiary trough whereby overflow or waste may be taken therefrom and replaced in said trough.

In testimony whereof I set my hand, in the presence of two witnesses, this 15th day of March, 1902.

JOHN F. BUTZ.

Witnesses:
  A. L. JACKSON,
  J. W. STITT.